US010719773B2

(12) United States Patent
Harper, III et al.

(10) Patent No.: US 10,719,773 B2
(45) Date of Patent: *Jul. 21, 2020

(54) MANAGING COMPUTATIONAL WORKLOADS OF COMPUTING APPARATUSES POWERED BY RENEWABLE RESOURCES (71) Applicant: Microsoft Technology Licensing, LLC, Redmond, WA (US)

(72) Inventors: David Tennyson Harper, III, Seattle, WA (US); Eric C. Peterson, Woodinville, WA (US); Shaun L. Harris, Sammamish, WA (US); Christian L. Belady, Mercer Island, WA (US)

(73) Assignee: Microsoft Technology Licensing, LLC, Redmond ( * ) Notice: Subject to any disclaimer, the term of this patent is extended or adjusted under 35 U.S.C. 154(b) by 1116 days.

This patent is subject to a terminal disclaimer.

(21) Appl. No.: 15/144,075

(22) Filed: May 2, 2016

(65) Prior Publication Data

US 2016/0247085 A1 Aug. 25, 2016

Related U.S. Application Data (63) Continuation of application No. 12/881,187, filed on Sep. 14, 2010, now Pat. No. 9,348,394.

(51) Int. Cl.
*G06N 7/00* (2006.01)
*G01W 1/10* (2006.01)
(Continued)

(52) U.S. Cl.
CPC .............. *G06N 7/005* (2013.01); *G01W 1/10* (2013.01); *G06F 1/3206* (2013.01); *G06F 1/329* (2013.01); *Y02D 10/24* (2018.01)

(58) Field of Classification Search
CPC ....... G06N 7/005; G01W 1/10; G06F 1/3206; G06F 1/329; Y02D 10/24
(Continued)

(56) References Cited

U.S. PATENT DOCUMENTS

| 6,449,603 B1 | 9/2002 | Hunter |
| 6,581,008 B2 * | 6/2003 | Intriligator ............. G01W 1/10 702/3 |

(Continued)

OTHER PUBLICATIONS

Kumar, et al., "How IT Management Can "Green" the Data Center", Retrieved at <<http://www.mitiweb.com/Source/Gartner_How_to_Green_the_Data_Center_pdf>>, Jan. 22, 2008, pp. 1-5.
(Continued)

*Primary Examiner* — Charles R Kasenge
(74) *Attorney, Agent, or Firm* — Medley, Behrens & Lewis, LLC (57) ABSTRACT

A method described herein includes an act of receiving data that is indicative of predicted weather conditions for a particular geographic region, wherein the particular geographic region has an energy generation system therein, and wherein the energy generation system utilizes at least one renewable energy resource to generate electrical power. The method also includes the act of scheduling a computational workload for at least one computer in a data center based at least in part upon the data that is indicative of the predicted weather conditions for the particular geographic region.

20 Claims, 7 Drawing Sheets (51) Int. Cl.
*G06F 1/329* (2019.01)
*G06F 1/3206* (2019.01)

(58) Field of Classification Search
USPC ........................................................ 700/291
See application file for complete search history.

(56) References Cited

U.S. PATENT DOCUMENTS

| | | | |
|---|---|---|---|
| 7,580,817 B2 | 8/2009 | Bing | |
| 7,698,233 B1 | 4/2010 | Edwards et al. | |
| 7,783,390 B2 | 8/2010 | Miller | |
| 7,962,769 B1* | 6/2011 | Patel | G06F 1/206 713/300 |
| 8,086,544 B2* | 12/2011 | Boss | G06Q 10/04 705/400 |
| 8,245,059 B2* | 8/2012 | Jackson | G06F 1/3203 713/300 |
| 8,473,759 B2* | 6/2013 | Albano | G06F 1/3203 713/300 |
| 8,473,769 B2* | 6/2013 | Albano | G06F 1/3203 713/340 |
| 8,700,929 B1 | 4/2014 | Weber et al. | |
| 8,793,365 B2* | 7/2014 | Arsovski | G06F 9/5027 709/224 |
| 9,159,042 B2* | 10/2015 | Steven | G06Q 10/06315 |
| 9,207,993 B2* | 12/2015 | Jain | G06F 9/5094 |
| 9,348,394 B2* | 5/2016 | Harper, III | G06F 1/3206 |
| 9,405,348 B2* | 8/2016 | Jackson | G06F 1/329 |
| 2002/0194113 A1* | 12/2002 | Lof | G01W 1/10 705/37 |
| 2003/0193777 A1 | 10/2003 | Friedeich et al. | |
| 2004/0167676 A1* | 8/2004 | Mizumaki | H02J 13/0082 700/286 |
| 2005/0039787 A1* | 2/2005 | Bing | G01W 1/10 136/243 |
| 2007/0250838 A1* | 10/2007 | Belady | G06F 11/3409 718/105 |
| 2009/0265568 A1* | 10/2009 | Jackson | G06F 1/3203 713/320 |
| 2009/0276095 A1* | 11/2009 | Pienta | G06F 1/206 700/277 |
| 2010/0023174 A1* | 1/2010 | Nagata | H02J 3/32 700/287 |
| 2010/0037225 A1* | 2/2010 | Doyle | G06F 1/3203 718/102 |
| 2010/0057641 A1 | 3/2010 | Boss et al. | |
| 2010/0138062 A1* | 6/2010 | Zheng | C10G 1/10 700/291 |
| 2010/0161147 A1 | 6/2010 | Adam | |
| 2010/0198420 A1 | 8/2010 | Rettger et al. | |
| 2010/0213761 A1* | 8/2010 | McDonald | G05F 1/67 307/18 |
| 2010/0228861 A1* | 9/2010 | Arsovski | G06F 9/5027 709/226 |
| 2011/0040417 A1* | 2/2011 | Wolfe | G06F 1/206 700/291 |
| 2011/0040550 A1* | 2/2011 | Graber | G06Q 10/06 703/18 |
| 2011/0055604 A1 | 3/2011 | Jackson | |
| 2011/0144814 A1* | 6/2011 | Menke | F03D 7/026 700/287 |
| 2011/0145621 A1* | 6/2011 | Albano | G06F 1/3203 713/340 |
| 2011/0282982 A1* | 11/2011 | Jain | G06F 9/5094 709/223 |
| 2011/0307109 A1 | 12/2011 | Sri-Jayantha | |
| 2012/0005683 A1* | 1/2012 | Bower | G06F 9/5094 718/103 |
| 2012/0065788 A1 | 3/2012 | Harper, III et al. | |
| 2014/0298349 A1* | 10/2014 | Jackson | G06Q 50/06 718/104 |

OTHER PUBLICATIONS

Timmer, John, "Renewable energy and the future of the datacenter", Retrieved at <<http://arstechnica.com/business/news/2008/05/renewable-energy-and-the-future-of-the-datacenter.ars<<, May 28, 2008, pp. 1-5.

"Techno-economic analysis of distributed generation options from renewable energy sources and grid-interaction scenarios for Totara Bank site", Retrieved at <<http://207.57.92.100/Lea%20Sigot%20_report%20INSA.pdf>>, Fourth year work placement report, Apr. 7-Aug. 31, 2008, pp. 1-69.

Wang, et al., "Towards Thermal Aware Workload Scheduling in a Data Center", Retrieved at <<http://cyberaide.googlecode.com/svn/trunk/papers/09-greenit-ispan1/vonLaszewski-ispan1.pdf>>, Dec. 14-16, 2009, pp. 1-7.

Mogen, Elizabeth, "Wind Energy Site Selection Processes and Best Practices from an International Perspective", Retrieved at <<http://2010.windpowerexpo.org/profile.cfm profile_name=session&master_key=A443A03E-8918-4A20-A09D-70424A17B1F9&page_key=A5B55F8E-CBD7-4503-8D51-E9262AAA1123&xtemplate>>, May 24, 2010, p. 1.

"Non-Final Office Action for U.S. Appl. No. 12/881,187", dated Oct. 26, 2012, 11 pages.

"Response to the Non-Final Office Action for U.S. Appl. No. 12/881,187", dated Jan. 28, 2013, 12 pages.

"Final Office Action for U.S. Appl. No. 12/881,187", dated Jun. 7, 2013, 12 pages.

"Response to the Final Office Action for U.S. Appl. No. 12/881,187", dated Dec. 1, 2013, 11 pages.

"Notice of Allowance and Fees Due for U.S. Appl. No. 12/881,187", dated Mar. 7, 2014, 13 pages.

"Amendments Submitted Concurrently with a Request for Continues Examination for U.S. Appl. No. 12/881,187", dated Jun. 4, 2014, 10 pages.

"Non-Final Office Action for U.S. Appl. No. 12/881,187", dated Aug. 22, 2014, 17 pages.

"Response to the Non-Final Office Action for U.S. Appl. No. 12/881,187", dated Jan. 22, 2015, 13 pages.

"Final Office Action for U.S. Appl. No. 12/881,187", dated May 20, 2015, 13 pages.

"Response to the Final Office Action for U.S. Appl. No. 12/881,187", dated Nov. 20, 2015, 13 pages.

"Notice of Allowance and Fees Due for U.S. Appl. No. 12/881,187", dated Jan. 20, 2016, 13 pages.

\* cited by examiner

MANAGING COMPUTATIONAL WORKLOADS OF COMPUTING APPARATUSES POWERED BY RENEWABLE RESOURCES

RELATED APPLICATION

This application is a continuation of U.S. patent application Ser. No. 12/881,187, filed on Sep. 14, 2010, and entitled "MANAGING COMPUTATIONAL WORKLOADS OF COMPUTING APPARATUSES POWERED BY RENEWABLE RESOURCES", the entirety of which is incorporated herein by reference.

BACKGROUND

Renewable energy resources are energy resources that are replaced by natural processes at rates faster than such energy resources can be consumed by humans or technically cannot be consumed at all. Examples of renewable energy resources include solar radiation, wind, tides, amongst others. Non-renewable energy resources are energy resources that cannot be produced naturally at the rate they are consumed by humans. Examples of non-renewable energy resources include fossil fuels, such as coal, petroleum, and natural gas, as well as materials utilized to generate nuclear power, such as uranium. These non-renewable energy resources may have environmental issues associated therewith; for instance, experts have posited that carbon generation may cause global warming.

As the population of the world has increased, demand for energy has likewise increased, due to increasing numbers of people as well as more sophisticated apparatuses that require energy to effectively operate. In an example, data centers that are configured to perform complex computational tasks require a significant amount of energy to operate effectively. For instance, relatively large data centers can have an electrical power draw of multiple megawatts at any particular point in time. Furthermore, recent studies indicate that costs of powering data centers is expected to exceed costs of equipment in the relatively near future.

The majority of energy consumed by humans is generated through utilization of non-renewable energy resources. Due to increasing costs and environmental concerns mentioned above, as well as prospects of significant taxation on atmospheric carbon generation, there is increasing global pressure to look to renewable energy sources for generating electrical power. Several issues still exist, however, with respect to power systems that utilize renewable energy resources to generate power. These issues include site selection as well as energy management.

Because renewable energy resources typically vary depending upon geographic location, selecting an appropriate site for a power system that utilizes a renewable energy resource to generate power is critical. Conventionally, selecting a site is accomplished by examining coarse valued data collected by established reporting sites such as airports (e.g., average daily wind speed, average number of sunny days per year) to identify potential site locations. Thereafter, instrumentation is physically deployed at a prospective site, and measurements are collected over an extended period of time (e.g., 1-3 years). Thus, this requires long-term planning and significant investment in determining appropriate sites. If the measurements indicate that the tested site is not appropriate, the process is restarted.

Furthermore, once the power system is constructed, the power system will output variable amounts of power over time, as the renewable energy resources vary over time and location. Accordingly, if demand for power does not correspond to supply, then consumers of power may not be provided with adequate power from the power system.

SUMMARY

The following is a brief summary of subject matter that is described in greater detail herein. This summary is not intended to be limiting as to the scope of the claims.

Described herein are various aspects pertaining to power systems that utilize renewable resources to generate electrical power. More particularly, described herein are various aspects pertaining to selecting a site to construct a power system that utilizes renewable resources to generate electrical power and aspects pertaining to managing computational workloads of computers that are powered by such a power system.

One or more computer-implemented predictive weather/climate models can be employed to select a site for placement of a power system that generates electrical power through utilization of a renewable energy resource. With more specificity, computer-based simulation of meteorological and climate systems can be employed to model availability of renewable energy resources at localized geographic regions. Moreover, the computer-based simulation can utilize topographical models in connection with modeling availability of renewable energy resources at localized geographies.

In an exemplary embodiment, selection of a site for a power system that utilizes renewable energy resources to generate electrical power can comprise utilization of a global model and a local model. The global model can be configured to model/simulate weather/climate conditions in a relatively large area, such as a ten mile by ten mile area, to facilitate locating a more precise geographic region to place a power system. Once such global model has been executed via simulation, a local model can be employed to more granularly model weather/climate conditions at a prospective site. The local model, for instance, can be configured to model/simulate weather/climate conditions in a smaller area, such as over a one mile by one mile region or smaller. These models can leverage historical weather data that is generally available, current weather data that is available (e.g., from news reports or web sites), weather data collected from on-site sensors, and local topological maps.

In accordance with another aspect, computational workloads on one or more computers in a data center can be scheduled based at least in part upon predicted power to be output by an electrical system that utilizes renewable energy resources to generate electrical power. The predicted power to be output can be over a time range, such that there are predictions with respect to power to be output in the relatively near future as well as predictions with respect to power to be output further into the future. Pursuant to an example, one or more weather/climate models can be executed to predict one or more weather conditions pertaining to a geographic region upon which the power system resides. The predicted weather conditions can be employed to predict power to be output by the power system, and this predicted power can be utilized to schedule computational workloads of one or more computers in a data center. For example, if the power system utilizes wind to generate power, and it is predicted that little wind will exist at a certain point in time in the future (and thus little power will be generated), maintenance can be scheduled with respect to one or more computers in the data center.

Other aspects will be appreciated upon reading and understanding the attached figures and description.

DETAILED DESCRIPTION

Various technologies pertaining to selecting a site for a power system that utilizes renewable energy resources to generate electrical power and various technologies pertaining to scheduling computational workload of one or more computers in a data center will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
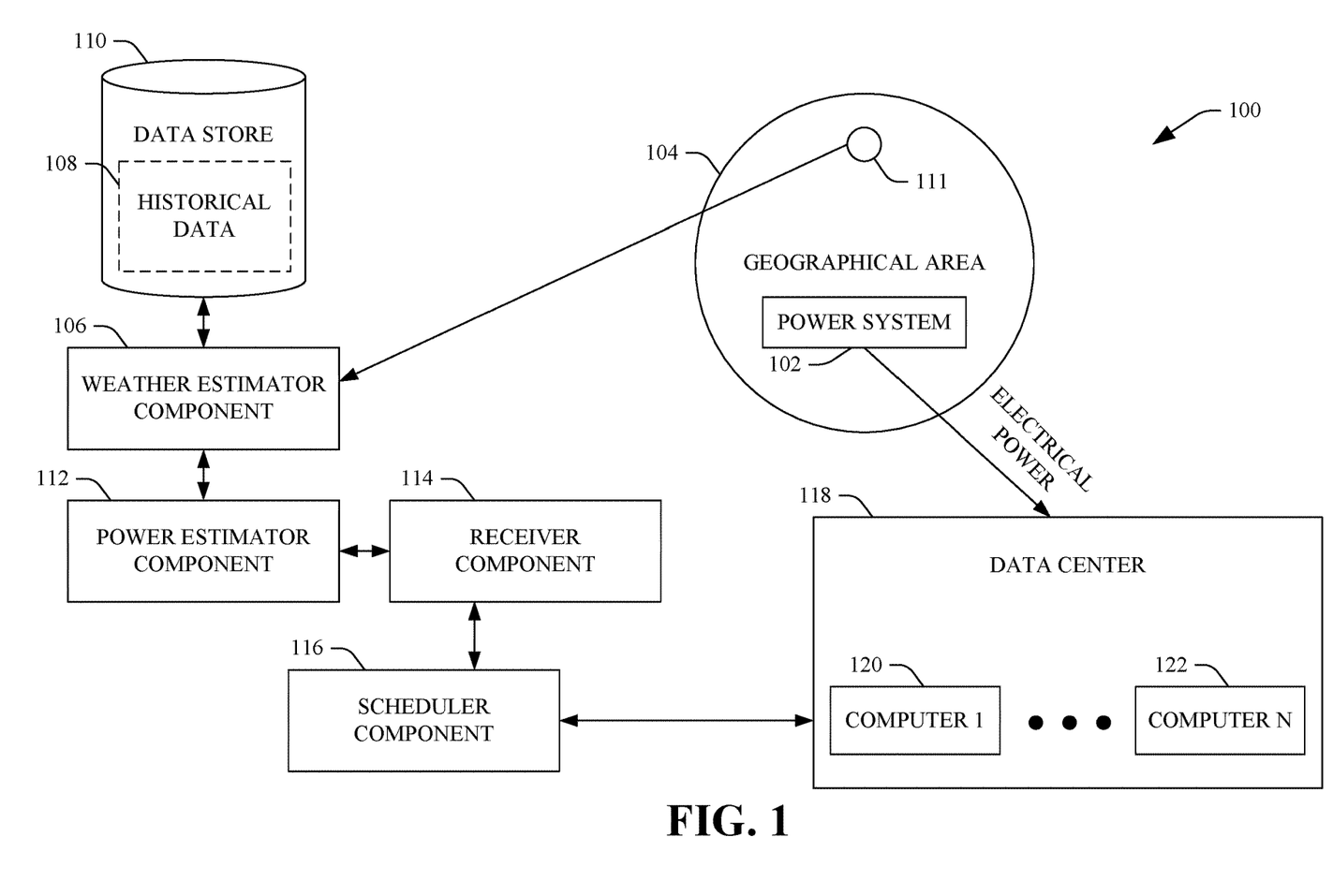
FIG. 1 is a functional block diagram of an exemplary system that facilitates scheduling computational workloads on computers in data centers.

With reference to FIG. 1, an exemplary system 100 that facilitates scheduling computational workloads of computing devices in a data center that are provided with power by a power system that employs renewable resources to generate electrical power is illustrated. A power system 102 that is configured to output electrical power based at least in part upon a renewable energy resource is resident in a particular geographic area 104. For example, the power system 102 may be configured to generate electrical power through utilization of wind power, solar radiation, tides (waves), water flow (e.g., hydro energy), geothermal energy, amongst other renewable energy resources. Thus, the power system 102 may comprise one or more wind turbines, solar panels, water turbines, and/or the like. As will be described in greater detail below, the power system 102 can be selectively placed in the geographic area 104 to substantially optimize electrical power output through utilization of a particular renewable resource.

The system 100 comprises a weather estimator component 106 that is configured to generate predictions/estimates of future weather/climate condition(s) with respect to the geographical area 104. In an example, the weather estimator component 106 can be configured to generate estimates/predictions of a future weather condition that pertains to a renewable resource that is employed by the power system 102 to generate electrical power, such as a predicted amount of wind at certain times in the future and/or a predicted amount of sunlight at certain times in the future. The weather estimator component 106 can generate the predictions/estimates of the future weather/climate conditions(s) based at least in part upon historical data 108 retained in a data store 110. In an example, the historical data 108 can comprise weather-related data obtained from organizations that collect and retain such data. These organizations may include national weather services, airports, Internet web sites, television stations, amongst other organizations.

Additionally, the weather estimator component 106 can generate predictions/estimates of future weather/climate condition(s) based at least in part upon data output by a sensor 111 that is proximate to the power system 102 in the geographical area 104. For example, the sensor 111 can sense wind speeds, barometric pressure, temperature, humidity, or other suitable condition. The weather estimator component 106 may then estimate/predict future weather/climate conditions based at least in part upon both the historical data 108 and data output by the sensor 111.

As mentioned above, the weather estimator component 106 can generate predictions for weather condition(s) over ranges of time. For instance, the weather estimator component 106 can generate predictions for a weather condition one or more seconds in the future, five minutes in the future, ten minutes in the future, a half hour in the future, an hour in the future, four hours in the future, eight hours in the future, a day in the future, two days in the future, a week in the future, etc. Additionally, the weather estimator component 106 can output data that is indicative of a certainty corresponding to a weather condition of interest. For example, the weather estimator component 106 can generate a prediction for a particular weather condition (e.g., wind speed) five minutes in the future and can also output data that indicates that there is 95% certainty that the predicted wind speed will be within two kilometers per hour of the actual wind speed five minutes in the future. Similarly, the weather estimator component 106 can be configured to output a predicted range with respect to at least one weather condition. For instance, the weather estimator component 106 can generate a prediction that there is a 75% probability that wind speeds will be between 10 kilometers an hour and 13 kilometers an hour a day into the future. The weather estimator component 106 can continuously update the predictions upon receipt of additional historical data and/or upon receipt of additional data received in real-time from the sensor 111 (or other sensors).

As will be appreciated by one skilled in the art, the weather estimator component 106 can utilize any of a variety of types of algorithms/functions in connection with predicting at least one weather condition pertaining to the geographical area 104. These algorithms/functions include algorithms/functions trained by way of machine learning. Thus, the weather estimator component 106 can be or include a Bayesian Network, a Support Vector Machine Model, an Artificial Neural Network, a classifier, a Regression Tree, a Fuzzy Analysis Algorithm, or the like.

The system 100 further comprises a power estimator component 112 that is in communication with the weather estimator component 106 and estimates an amount of power that will be generated by the power system 102 at various times in the future based at least in part upon one or more weather conditions predicted/estimated by the weather estimator component 106. For example, the power estimator component 112 can access a table that indicates an amount of power to be generated by the power system 102 given a value for a particular weather condition. That is, the table can include at least two columns: a first column that comprises values for a particular weather condition and a second column that comprises corresponding values for power expected to be output by the power system 102. Of course, in practice, the power system 102 can output power based upon a variety of factors, including but not limited to current weather conditions and previous weather conditions. For instance, the angular velocity of a wind turbine will depend upon historical wind speeds, an amount of air density (e.g., moisture in the air), etc. Accordingly, the power estimator component 112 can access a multi-column table that takes into consideration historical weather conditions in the geographical area 104, current weather conditions in the geographical area 104, and predicted weather conditions in the geographical area 104. The power estimator component 112 can predict/estimate power to be output by the power system 102 by accessing appropriate portions of the multi-dimensional table.

In another exemplary embodiment, the power estimator component 112 can be or include a learned algorithm that can predict electrical power to be generated by the power system 102 at future instances in time as a function of a variety of factors, including historical power generated by the power system 102, historical (recent) weather conditions, current conditions pertaining to the power system (a current angular velocity of a wind turbine, a current angular acceleration or deceleration of the wind turbine, a current amount of radiation received at a solar panel, etc.), historical conditions pertaining to the power system, amongst other factors. The learned algorithm may be or include a Bayesian Network, a Support Vector Machine Model, an Artificial Neural Network, a classifier, a Regression Tree, a Fuzzy Analysis Algorithm, or the like.

The system 100 further comprises a receiver component 114 that receives the estimated/predicted electrical power to be output by the power system 102 from the power estimator component 112. For instance, the receiver component 114 can be a port on a computing apparatus, a firmware interface to a computing device, or some other suitable interface.

A scheduler component 116 is in communication with the receiver component 114 and schedules computational workload of at least one computer executing in a data center based at least in part upon the estimate/predicted electrical power to be output by the power system 102. Pursuant to an example, a data center 118 can be provided with electrical power from the power system 102, such that multiple computers 120-122 in the data center 118 are provided with electrical power from the power system 102. In a particular example, the data center 118 may be co-located with the power system 102 such that they are in the same geographical area 104 (e.g., within one kilometer of one another). The data center 118 may be classified as any suitable tier by a suitable standards organization. In other words, the data center 118 may be a tier 1 data center, a tier 2 data center, a tier 3 data center, or a tier 4 data center. The computers 120-122 may be any suitable computing devices, including servers, routers, gateways, and/or other equipment that is commonly found in data centers. Pursuant to a particular example, the data center 118 may be a relatively large data center that is co-located with the power system 102, such that the primary purpose of the power system 102 is to provide electrical power to the data center 118. While not shown, the data center 118 may also be provided with power from a power system on a conventional electrical grid in case of failure of the power system 102 to provide a requisite amount of power to the data center 118.

As mentioned above, the scheduler component 116 is configured to schedule computational workloads of at least one of the computers 120-122 in the data center 118 based at least in part upon an amount of electrical power predicted to be output by the power system 102 in the future. Thus, the scheduler component 116 allows for workloads to be updated in accordance with varying weather/climate conditions that cause the power system 102 to output variable electrical power.

Pursuant to an example, the power system 102 may generate electrical power through utilization of wind that drives a wind turbine. The weather estimator component 106 can predict high rates of wind over the next several hours, and the power estimator component 112 can thus estimate that the power system 102 will be outputting electrical power at or near maximum capacity. The scheduler component 116 can thus schedule relatively high computational workloads for computers in the data center 118 over the next several hours. In another example, the weather estimator component 106 can predict that there will be a small amount of wind in a few days, and therefore the power estimator component 112 can estimate that the power system 102 will output a relatively small amount of electrical power. The scheduler component 116 can schedule computational workloads of the computers 120-122 in the data center accordingly, such as scheduling maintenance of one or more of the computers 120-122 in the data center 118. Additionally, the scheduler component 116 can push computational workloads to other data centers that are expected to have a sufficient amount of electrical power to support such workloads.

Figure 2:
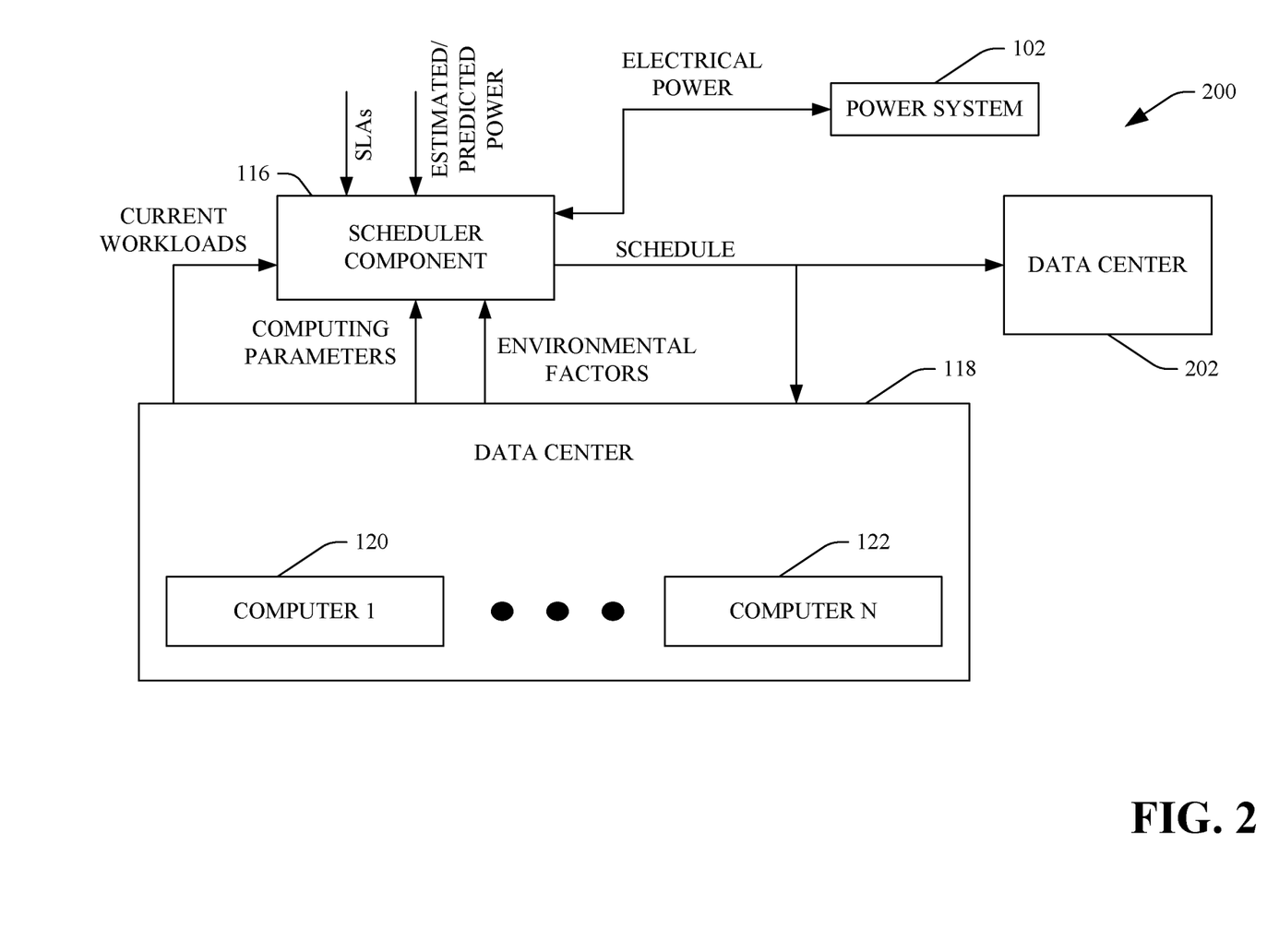
FIG. 2 is a functional block diagram of an exemplary system that facilitates scheduling computational workloads on computers in data centers.

Turning now to FIG. 2, an exemplary system 200 that facilitates scheduling computational workloads on one or more computers in a data center is illustrated. The system 200 comprises the scheduler component 116 that can schedule computational workloads for one or more of the computers 120-122 in the data center 118 based upon a variety of parameters. For example, the data center 118 may be utilized in a cloud computing environment, wherein multiple customers utilize resources of the data center 118 to perform computing tasks. In such an example, the data center 118 can comprise a plurality of computers, wherein the plurality of computers are configured to perform computational tasks for the plurality of different customers in accordance with service level agreements (SLAs) corresponding to the customers. An SLA for any given customer may include guarantees with respect to system uptime, computational resources guaranteed to be available to the customer corresponding to the SLA, a minimum number of CPU cycles over a threshold amount of time with respect to the customer, a threshold amount of data storage space with respect to the particular customer, etc. Because for any given customer the SLAs may include threshold computing requirements, the scheduler component 116 can schedule computational workloads of one or more of the computers 120-122 in the data center based at least in part upon the SLAs in addition to the predicted electrical power to be output by the power system 102.

Additionally or alternatively, the scheduler component 116 can schedule computational workloads of one or more computers 120-122 based at least in part upon a current amount of electrical power being generated by the power system 102 (and provided to the data center 118). For instance, one or more sensors can be configured to monitor electrical power output by the power system 102, and the scheduler component 116 can receive data output by the one or more sensors. The scheduler component 116 can then schedule computational workloads of the one or more computers 120-122 based at least in part received data from the sensors.

Still further, the scheduler component 116 can schedule computational workloads of one or more of the computers 120-122 in the data center 118 based at least in part upon current and/or recent workloads of the computers 120-122 in the data center 118. For instance, if the computer 120 has been operating at maximum capacity over the last several hours while the computer 122 has been operating at 40% capacity over the same time frame, then the scheduler component can output a workload schedule that results in a shift of some of the computational workload of the computer 120 to the computer 122.

Additionally or alternatively, the scheduler component 116 can schedule computational workloads of one or more computers 120-122 in the data center 118 based at least in part upon computing parameters pertaining to the computers 120-122. These computing parameters can include speed of processors in the computers 120-122, amount and type of memory in the computers 120-122, amount and type of hard drive storage space in the computers 120-122, an amount of time since the computers 120-122 have been rebooted, temperatures proximate to the computers 120-122, amongst other computing parameters.

Moreover, the scheduler component 116 can schedule computational workloads of the one or more computers 120-122 in the data center 122 based at least in part upon one or more external environmental factors. For example, computers in data centers operate most efficiently at certain temperatures and humidity. One or more sensors can be configured to output environmental data that is received by the scheduler component 116, and the scheduler component 116 can schedule workloads of one or more of the computers 120-122 based at least in part upon data received from the sensor(s).

Additionally, the scheduler component 116 can schedule workloads for computers in a different data center 202 based at least in part upon the estimated/predicted power output by the power estimator component 112. For example, the estimated/predicted power to be output by the power system 102 may be too low to provide sufficient power to the computers 120-122 to meet requirements of SLAs corresponding to customers of the data center 118. In such a situation, the scheduler component 116 can generate a schedule that shifts computational workloads from the computers 120-122 in the data center 118 to computers in the different data center 202. For instance, the data center 202 may be powered by way of a conventional electrical power grid.

Figure 3:
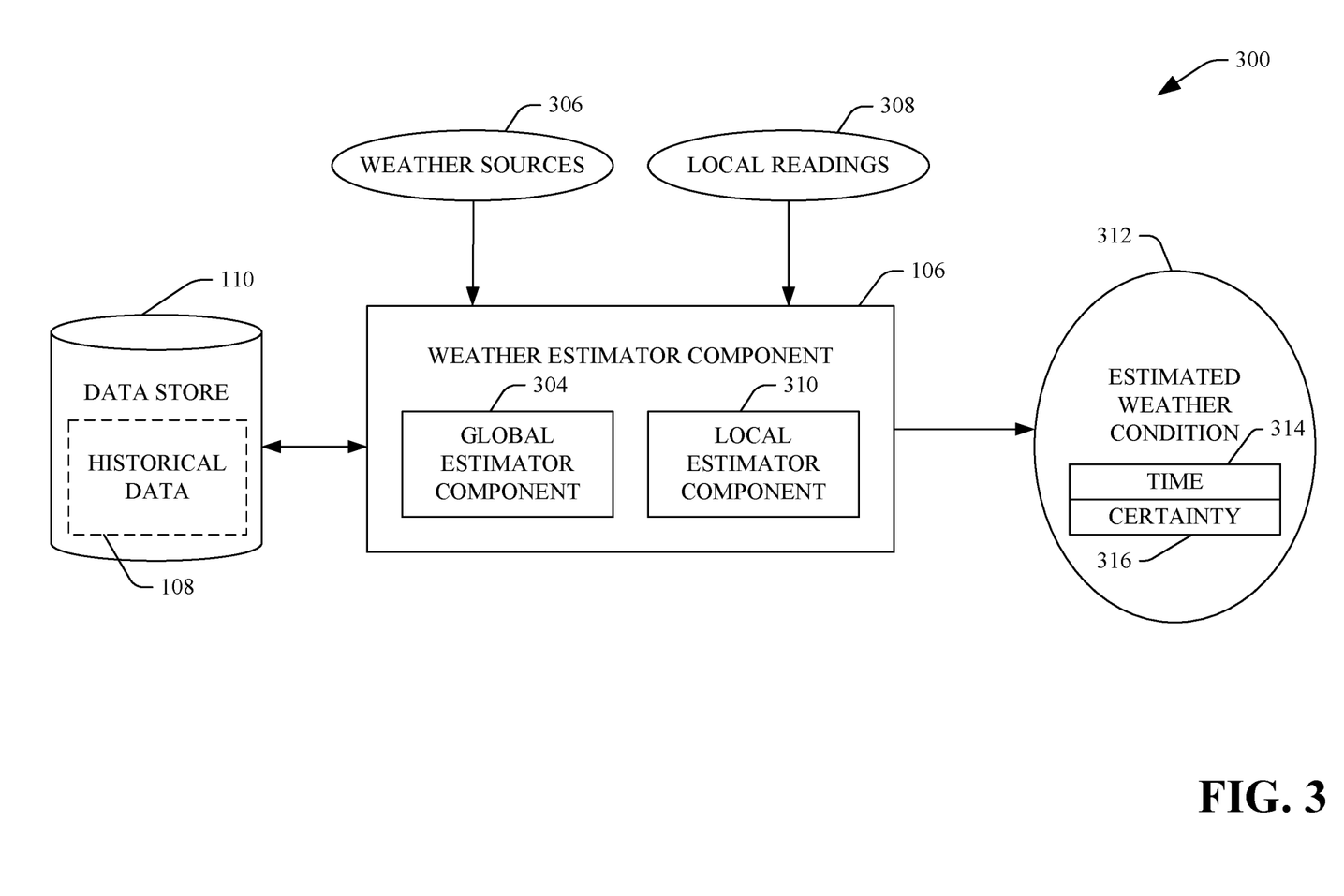
FIG. 3 is a functional block diagram of an exemplary system that facilitates predicting weather conditions in a particular geographic region.

Referring now to FIG. 3, an exemplary system 300 that facilitates predicting weather conditions with respect to the geographical area 104 is illustrated. The system 300 comprises the weather estimator component 106. The weather estimator component 106 can be employed to predict future weather conditions such that power output by a power system that utilizes renewable resources to generate electrical power can be predicted. In another embodiment, the weather estimator component 106 can be employed to predict future weather conditions in connection with selecting a site to place a power system that utilizes renewable energy resources to generate electrical power. Accordingly, the weather estimator component 106 can be configured to predict at least one weather condition and/or climate condition many years into the future.

Pursuant to an example, the weather estimator component 106 can include a global estimator component that is configured to estimate one or more weather/climate conditions in a relatively large area, such as a 100 kilometer by 100 kilometer area, a ten kilometer by ten kilometer area, or a five kilometer by five kilometer area. The global estimator component 304 can include or utilize topological data pertaining to a region of interest in connection with outputting predicted weather/climate condition(s) over time. Additionally, the global estimator component 304 can utilize the historical data 108 in the data store 110, weather data from one or more weather sources 306, and local readings 308 in the geographic region of interest. For instance, the historical data 108 can include historical weather data pertaining to the geographic region of interest. The weather sources 306 can include airports, television stations, web sites, or other suitable sources of weather information. The local readings 308 can be captured by sensors placed in the geographic region of interest.

The weather estimator component 106 can also comprise a local estimator component 310 that is configured to output weather/climate predictions for a geographic area that is smaller than the geographic area associated with the global estimator component 304. For example, the local estimator component 310 can be configured to simulate weather/climate conditions over a one kilometer by one kilometer area, a one half kilometer by one half kilometer area, or a one quarter kilometer by one quarter kilometer area. The local estimator component 310 can generate predictions for weather/climate conditions based at least in part upon the historical data 108 in the data store 110, data from the weather sources 306, and local readings 308. The local estimator component 310 may be configured to output more fine-grained predictions with respect to the geographical region of interest, which may be particularly useful for selecting a site to place a power system that utilizes renewable energy resources to generate electrical power.

Pursuant to an example, the weather estimator component 106 may be configured to aid in selecting a site for construction of a power system that utilizes renewable resources to generate electrical power in the following manner: first, existing weather maps can be analyzed to ascertain potential areas where such a power system may be desirably located. Thereafter, the global estimator component 304 can be utilized to simulate one or more weather/climate conditions over time over the region corresponding to the global estimator component 304. That is, the global estimator component 304 can simulate weather conditions over many years to determine desirability of a particular geographic region with respect to constructing a power system. The global estimator component 304 can utilize the resources discussed above to perform the simulation, as well as topographical data that can be obtained from topographical maps and/or custom-made topological models of the area. For instance, the topological maps/models may be relatively granular, such that they indicate locations of ridges, valleys, and other topological features. Simulations executed using the topological maps/models can indicate, for instance, that on average a greater amount of wind is expected to exist in a particular valley than in a plain that is proximate to such valley. If the simulations indicate that the general area may be desirable for construction of a power system that utilizes renewable resources to generate electrical power, then the local estimator component 310 can be executed.

Specifically, the local estimator component 310 can be configured to simulate climate/weather conditions with respect to a smaller region, and more granularly, when compared to predictions output by the global estimator component 304. For instance, the local estimator component 310 can be provided with a detailed topological map with respect to a potential construction site, and the local estimator component 310 can utilize the resources discussed above (the historical data 108, the weather sources 306, and the local readings 308) together with the topological map to output estimates/predictions of at least one weather/climate condition in the future. The local estimator component 310 can generate predictions for weather conditions many years into the future (e.g., the local estimator component 310 can simulate wind conditions many years into the future if it is desirable to place one or more wind turbines in a geographic area that corresponds to the local estimator component 310). It can be ascertained that as computing resources continue to advance, the need for separate global simulation and local simulation may subside.

Accordingly, each of the global estimator component 304 and the local estimator component 310 can output an estimated weather condition 312 at one or more points in the future. Each predicted weather condition may have a time 314 and certainty 316 corresponding thereto. The time 314 can indicate a time in the future that the estimated weather condition 312 is predicted to occur, and the certainty 316 can indicate a certainty of occurrence of such prediction. This data may be employed to aid in selecting a site to construct a power system described herein and/or determining if a candidate site is suitable for constructing a power system that utilizes renewable resources to generate electrical power. Also, in summary, either or both of the global estimator component 304 and the local estimator component 310 can utilize granular topological data to output predictions with respect to weather/climate condition(s) that are germane to a renewable resource that is desirably utilized to generate electrical power. As mentioned previously, this granular topological data can be utilized in the course of simulation to indicate where, with precision, a power system is desirably positioned based at least in part upon predictions with respect to one or more weather conditions pertaining to such topology.

Moreover, as described above, the weather estimator component 106 can be employed to predict weather conditions for utilization in connection with predicting an amount of power that will be output by a power system that utilizes renewable energy resources to generate electrical power. Thus, one or more of the global estimator component 304 or the local estimator component 310 can be employed to predict weather/climate predictions for utilization in connection with predicting power to be output by a power system that utilizes renewable energy resources to generate electrical power.

Figure 4:
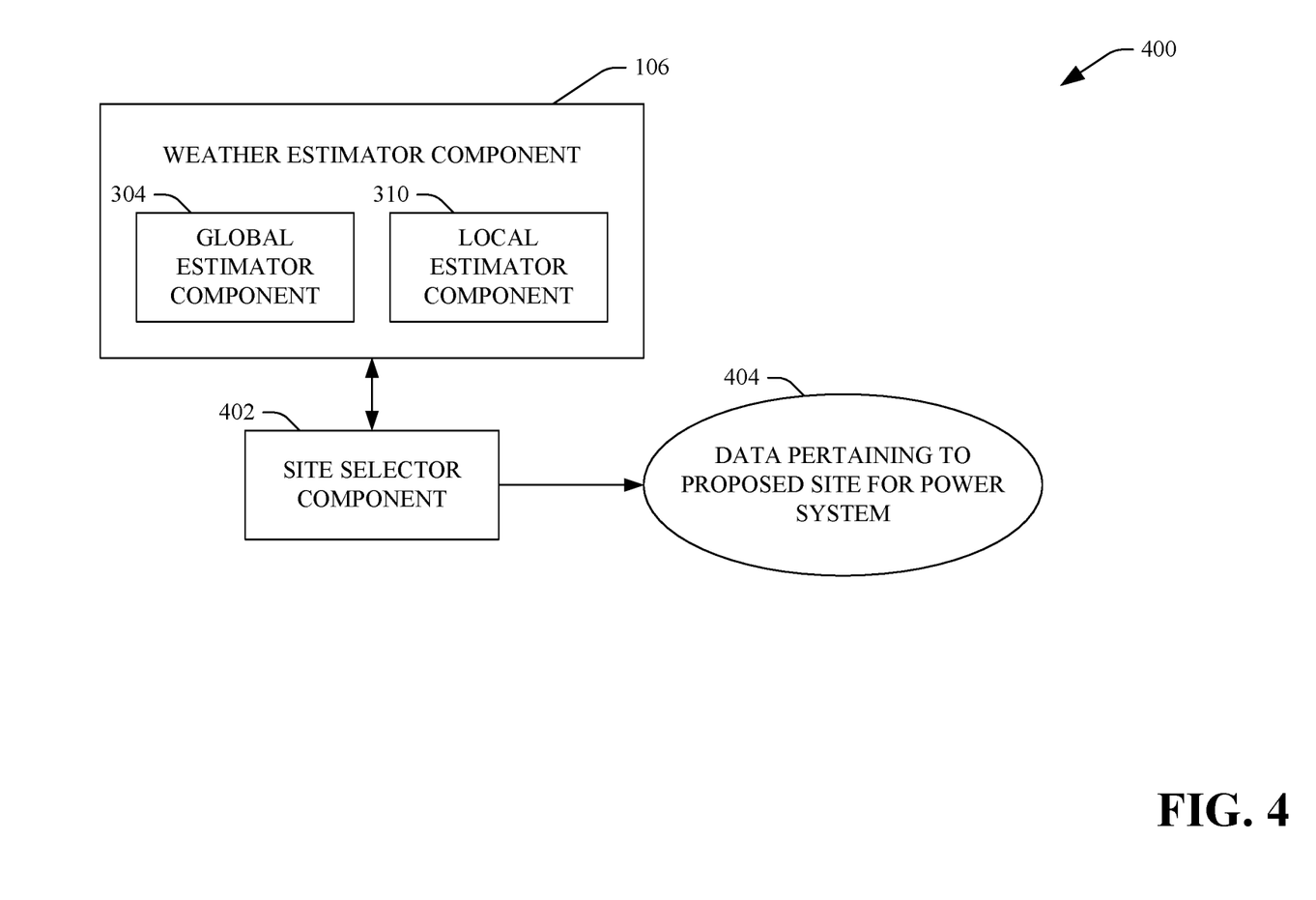
FIG. 4 is a functional block diagram of an exemplary system that facilitates selecting a site for constructing a power system that utilizes renewable resources to generate electrical power.

With reference now to FIG. 4, an exemplary system 400 that facilitates selecting a site to construct a power system that utilizes renewable energy resources to generate electrical power is illustrated. The system comprises the weather estimator component 106, which comprises the global estimator component 304 and the local estimator component 310 as described above. The weather estimator component 106, as described above, is configured to execute simulations of one or more weather conditions over time and/or climate changes over time, wherein such simulations can be employed to ascertain whether a prospective site is suitable for constructing a power system.

The system 400 further includes a site selector component 402 that receives simulations output by the weather estimator component 106 and determines a particular location that is suitable for constructing a power system as described herein. Additionally or alternatively, the site selector component 402 can, for a proposed site, output data that indicates whether or not the proposed site is suitable for constructing a power system as described herein. Thus, generally, the site selector component 402 can output data 404 pertaining to a proposed site for a power system that utilizes renewable resources to generate electrical power based at least in part upon estimated weather/climate conditions output by the weather estimator component 106.

Figure 5:
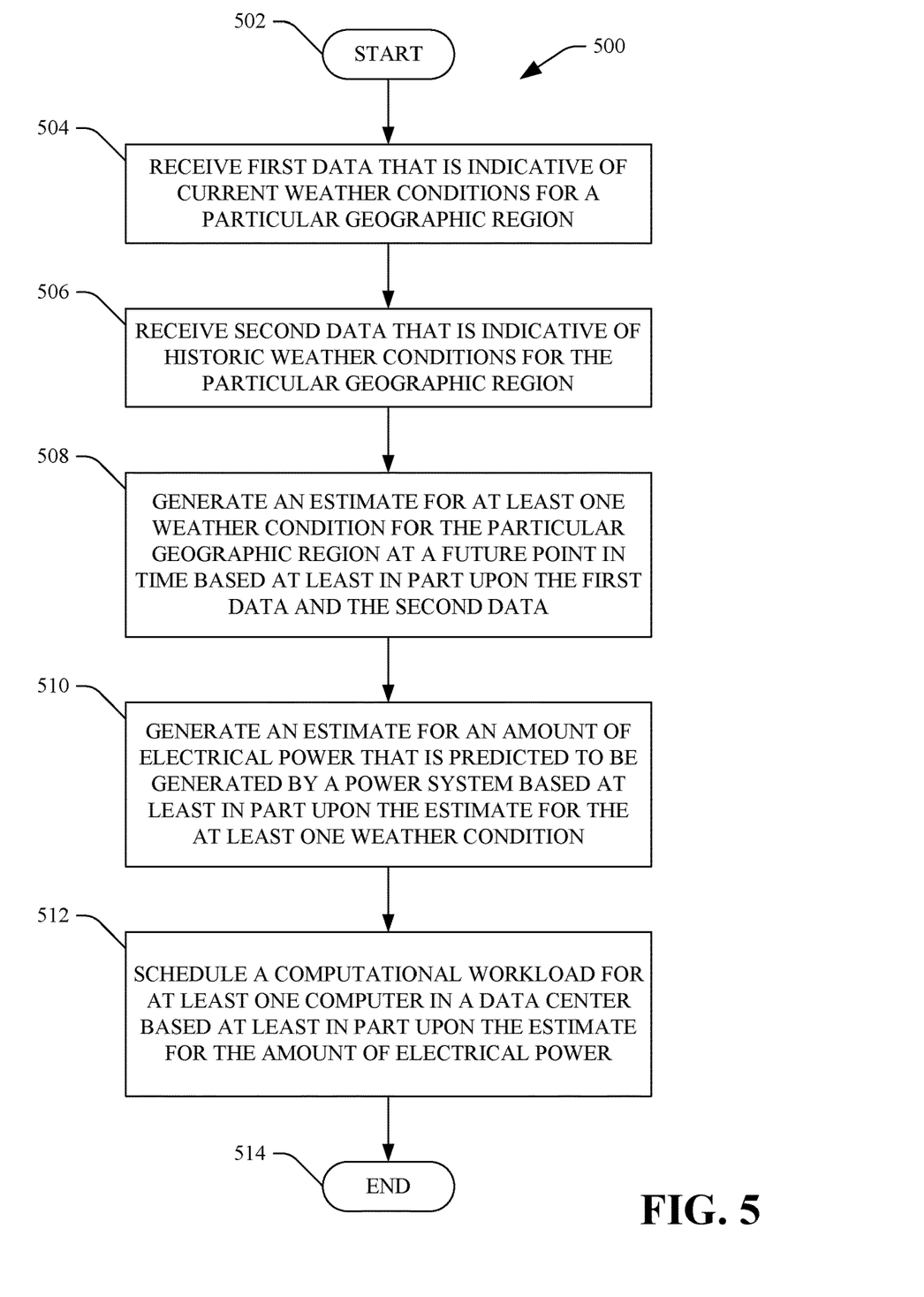
FIG. 5 is a flow diagram that illustrates an exemplary methodology for scheduling computational workload for at least one computer in a data center.
Figure 6:
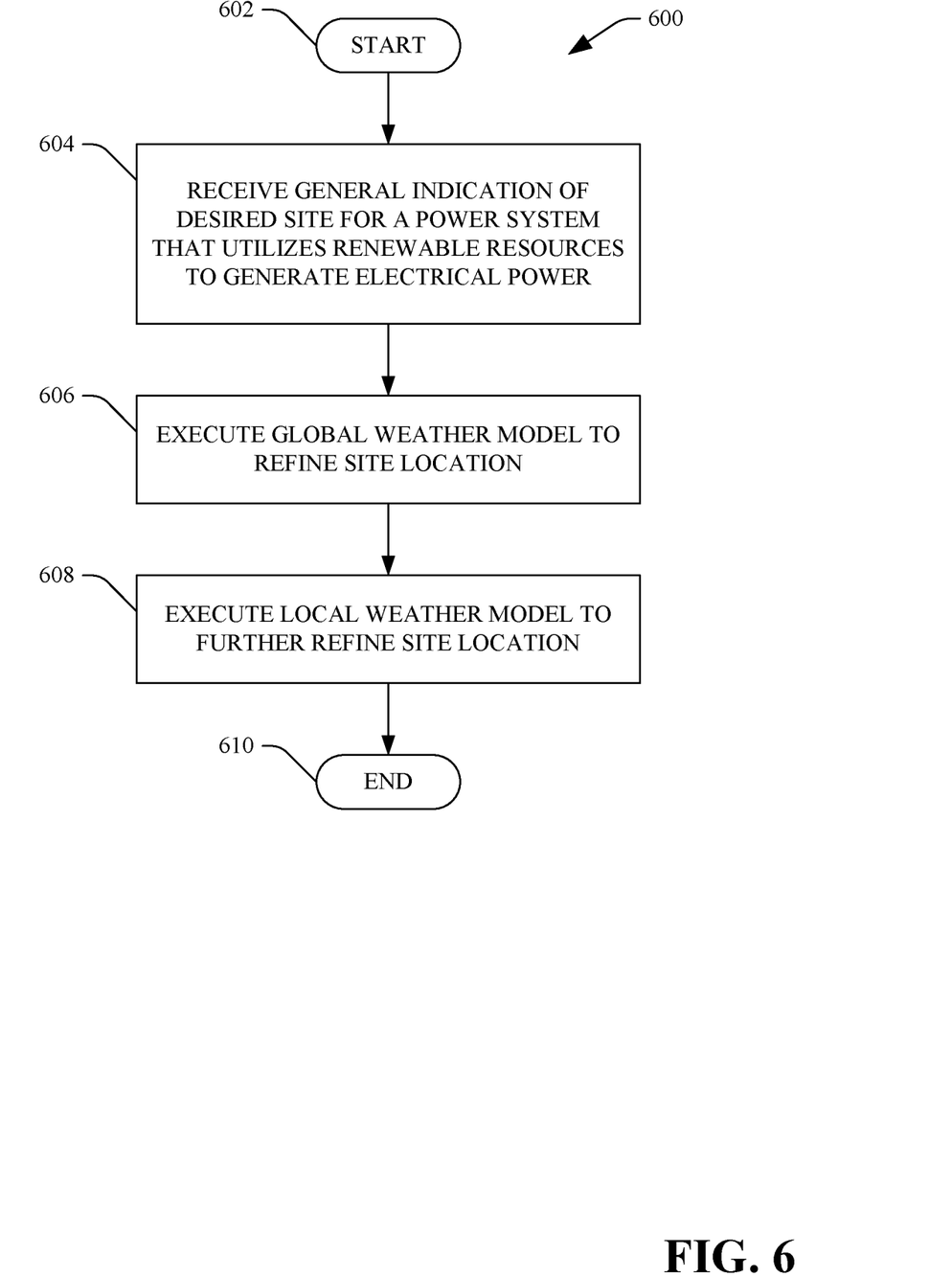
FIG. 6 is a flow diagram that illustrates an exemplary methodology for executing a global and local weather simulation in connection with selecting a site to construct a power system.

With reference now to FIGS. 5-6, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 5, a methodology 500 that facilitates scheduling a computational workload for at least one computer in a data center that is powered by a power system that utilizes a renewable energy resource to generate electrical power is illustrated. The methodology 500 begins at 502, and at 504 first data is received that is indicative of current weather conditions for a particular geographic region. The first data can be received, for instance, from a weather reporting service, from one or more sensors proximate to the geographic region, or other suitable source.

At 506, second data is received that is indicative of historic weather conditions for the particular geographic region. The second data can be received from a weather collection and retention service, a television station, a web site, or the like.

At 508, an estimate is generated for at least one weather condition for the particular geographic region at a future point in time based at least in part upon the first data and the second data. For instance, one or more simulations can be executed to generate the estimate for the at least one weather condition.

At 510, an estimate is generated for an amount of electrical power that is predicted to be generated by a power system that generates electrical power through utilization of a renewable resource based at least in part upon the estimate for the at least one weather condition. At 512, a computational workload is scheduled for at least one computer in a data center based at least in part upon the estimate for the amount of electrical power. In particular, the data center, and thus the computer, is powered by the power system. The methodology 500 completes at 514.

Referring now to FIG. 6, a methodology 600 that facilitates determining if a particular geographic location is a suitable site for constructing a power system that utilizes a renewable energy resource to generate electrical power is illustrated. The methodology 600 starts at 602, and at 604 a general indication of a desired site for a power system that utilizes a renewable energy resource to generate electrical power is received. For instance, this general indication can be received from a human reviewing an existent weather map.

At 606, a global weather model is executed to refine the site location. For example, the global weather model can be configured to generate weather/climate simulations over a one hundred square kilometer area. These simulations can be analyzed to select a more refined site. At 608, a local weather model is executed to further refine a site location. For instance, the location weather model can be configured to generate weather/climate simulations over a one square kilometer area. An appropriate site for constructing the power system can be selected based at least in part upon the execution of the local weather model.

Figure 7:
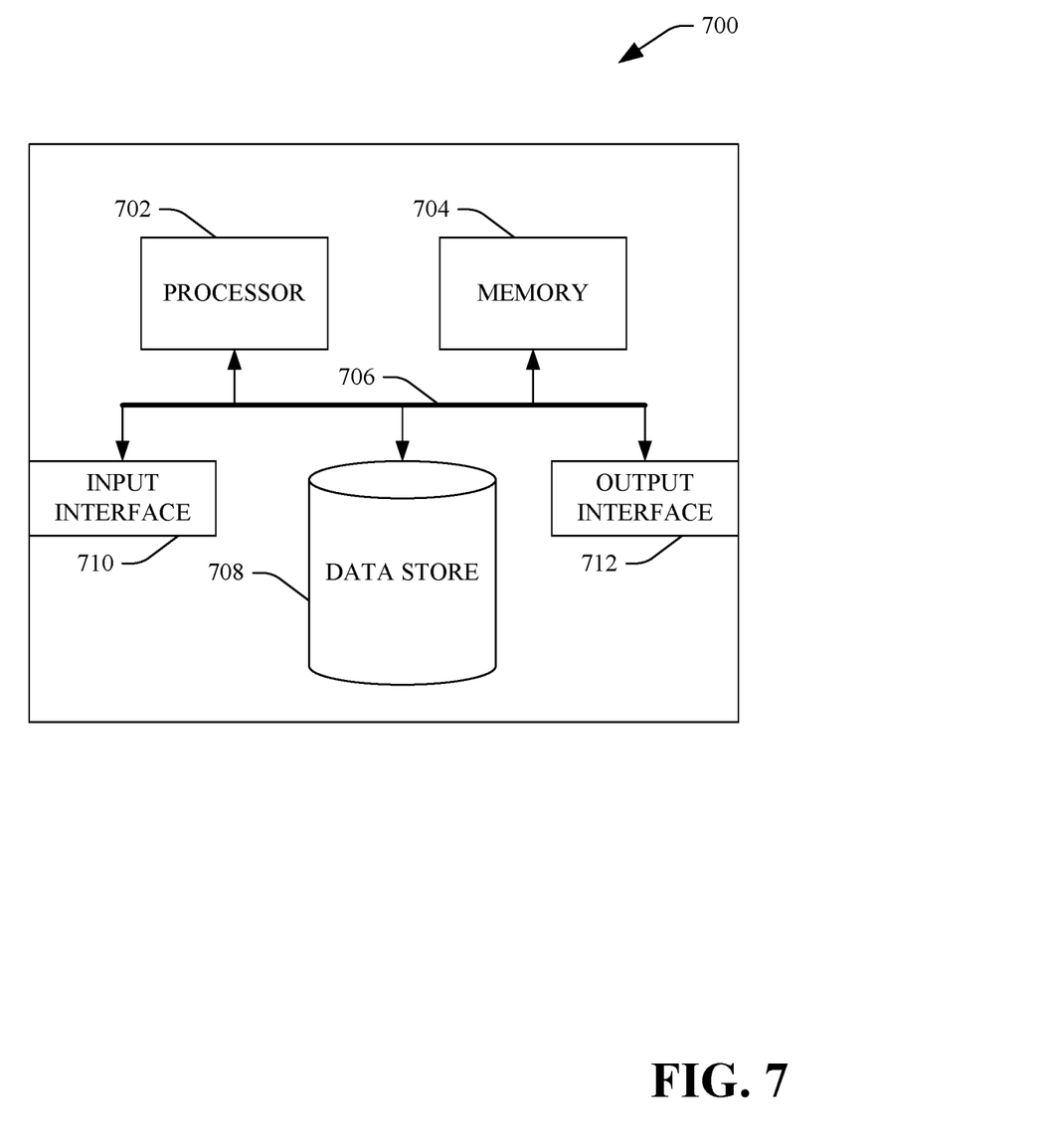
FIG. 7 is an exemplary computing system.

Now referring to FIG. 7, a high-level illustration of an example computing device 700 that can be used in accordance with the systems and methodologies disclosed herein is illustrated. For instance, the computing device 700 may be used in a system that supports selecting a construction site for a power system that utilizes a renewable energy resource to generate electrical power. In another example, at least a portion of the computing device 700 may be used in a system that supports scheduling a computational workload for a computer in a data center that is powered by a power system that utilizes a renewable energy resource to generate electrical power. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store topological maps, historical weather data, etc.

The computing device 700 additionally includes a data store 708 that is accessible by the processor 702 by way of the system bus 706. The data store may be or include any suitable computer-readable storage, including a hard disk, memory, etc. The data store 708 may include executable instructions, historical weather data, weather simulation data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computing system, the method comprising:
    predicting an amount of electrical power that is to be generated by a power system at a point in time between four hours and eight hours in the future, the power system generates electrical power based upon a renewable resource, the power system provides electrical power to a data center; and
    scheduling a computational workload for at least one computing device in the data center based upon the predicted amount of electrical power that is to be generated by the power system at the point in time in the future.

2. The method of claim 1, further comprising:
    predicting a weather condition at a location of the power system, the weather condition predicted for the point in time in the future, wherein the amount of electrical power that is to be generated by the power system at the point in time in the future is predicted based upon the weather condition.

3. The method of claim 2, wherein the power system comprises a wind turbine, and wherein the amount of electrical power that is to be generated by the power system at the point in time in the future is predicted based upon velocity of wind predicted for the point in time in the future.

4. The method of claim 3, wherein the amount of electrical power that is to be generated by the power system at the point in time in the future is predicted based upon data that is indicative of current angular velocity of a blade of the wind turbine.

5. The method of claim 2, wherein the power system comprises a solar panel, and wherein the amount of electrical power that is to be generated by the power system at the point in time in the future is predicted based upon an amount of sunlight that is predicted to incident upon the solar panel at the point in time in the future.

6. The method of claim 1, wherein scheduling the computational workload for the at least one computing device in the data center comprises scheduling the at least one computing device for maintenance at the point in time in the future.

7. The method of claim 1, wherein scheduling the computational workload for the at least one computing device in the data center comprises transferring the computational workload from the at least one computing device to another computing device in a different data center.

8. The method of claim 1, further comprising:
    predicting a second amount of electrical power that is to be generated by the power system at a second point in time between one day and two days in the future; and
    scheduling the computational workload for the at least one computing device in the data center based upon the predicted second amount of electrical power that is to be generated by the power system at the second point in time in the future.

9. The method of claim 1, wherein scheduling of the computational workload for the at least one computing device in the data center is further based upon a current amount of electrical power being generated by the power system.

10. The method of claim 1, wherein scheduling of the computational workload for the at least one computing device in the data center is further based upon a current workload of the at least one computing device.

11. The method of claim 1, wherein the predicted amount of electrical power is insufficient to perform the computational workload, wherein the computing system schedules the computational workload such that electrical power requirements of the computational workload are met.

12. A computing system comprising:
  at least one processor; and
  memory storing instructions that, when executed by the at least one processor, cause the at least one processor to perform acts comprising:
    predicting a weather condition at a geographic location at a point in time that is between four hours and eight hours in the future;
    predicting an amount of electrical power that is to be generated by a power system at the point in time in the future, the amount of electrical power predicted based upon the weather condition, the power system configured to generate electrical power through use of a renewable resource, the power system configured to supply electrical power to at least one computing device in a data center; and
    scheduling a computational workload for the at least one computing device in the data center based upon the amount of electrical power that is to be generated by the power system at the point in time in the future.

13. The computing system of claim 12, the weather condition being wind velocity at the geographic location at the point in time in the future.

14. The computing system of claim 12, the weather condition being an amount of solar radiation that is expected to be incident upon a solar panel that is located at the geographic location.

15. The computing system of claim 12, wherein scheduling the computational workload for the at least one computing device in the data center comprises scheduling maintenance for the at least one computing device in the data center at the point in time in the future.

16. The computing system of claim 12, wherein scheduling the computational workload for the at least one computing device in the data center comprises shifting a computational task from the at least one computing device in the data center to another computing device in another data center.

17. The computing system of claim 12, wherein predicting the amount of electrical power that is to be generated by the power system at the point in time in the future is further based upon a current sensed condition of the power system.

18. The computing system of claim 17, the power system comprising a wind turbine, the current sensed condition being angular velocity of a blade of the wind turbine.

19. The computing system of claim 12, the acts further comprising:
  updating the predicted amount of electrical power that is to be generated at the point in time in the future; and
  updating the schedule of the computational workload responsive to updating the predicted amount of electrical power that is to be generated at the point in time in the future.

20. A system comprising:
  a power system that generates electrical power based upon a renewable resource;
  a data center that comprises a plurality of computing devices, wherein the power system provides the data center with electrical energy;
  at least one computing device that is configured to:
    generate a prediction as to an amount of electrical power that is to be output by the power system at a point in time in the future, the point in time in the future being between four and eight hours into the future; and
    schedule a computational workload for at least one computing device in the data center based upon the prediction as to the amount of electrical power that is to be output by the power system at the point in time in the future.

* * * * *